United States Patent
Dong et al.

(10) Patent No.: US 11,876,337 B2
(45) Date of Patent: Jan. 16, 2024

(54) THREE-LEVEL SYSTEM FIBER LASERS INCORPORATING AN ALL-SOLID PHOTONIC BANDGAP FIBER

(71) Applicant: CLEMSON UNIVERSITY, Clemson, SC (US)

(72) Inventors: Liang Dong, Clemson, SC (US); Turghun Matniyaz, Clemson, SC (US)

(73) Assignee: CLEMSON UNIVERSITY, Clemson, SC (US)

( * ) Notice: Subject to any disclaimer, the term of this patent is extended or adjusted under 35 U.S.C. 154(b) by 34 days.

(21) Appl. No.: 17/026,760

(22) Filed: Sep. 21, 2020

(65) Prior Publication Data

US 2021/0210921 A1    Jul. 8, 2021

Related U.S. Application Data

(60) Provisional application No. 62/925,966, filed on Oct. 25, 2019.

(51) Int. Cl.
| | |
|---|---|
| *H01S 3/067* | (2006.01) |
| *H01S 3/0941* | (2006.01) |
| *H01S 3/17* | (2006.01) |
| *H01S 3/094* | (2006.01) |
| *H01S 3/16* | (2006.01) |

(52) U.S. Cl.
CPC ...... *H01S 3/06741* (2013.01); *H01S 3/06716* (2013.01); *H01S 3/06733* (2013.01); *H01S 3/09415* (2013.01); *H01S 3/094007* (2013.01); *H01S 3/1618* (2013.01); *H01S 3/175* (2013.01); *H01S 3/176* (2013.01); *H01S 3/0675* (2013.01); *H01S 3/094042* (2013.01); *H01S 3/094053* (2013.01)

(58) Field of Classification Search
CPC ............. H01S 3/06741; H01S 3/06733; H01S 3/08031; H01S 3/1618; H01S 3/094042
See application file for complete search history.

(56) References Cited

U.S. PATENT DOCUMENTS

| | | | |
|---|---|---|---|
| 5,530,710 A | 6/1996 | Grubb | |
| 5,907,652 A * | 5/1999 | DiGiovanni | G02B 6/021 385/125 |

(Continued)

OTHER PUBLICATIONS

Boullet et al., "High Power Ytterbium-Doped Rod-Type Three-Level Photonic Crystal Fiber Laser", Oct. 27, 2008, Optical Society of America, Optics Express, vol. 16, No. 22, 17891-17902. (Year: 2008).*

(Continued)

*Primary Examiner* — Joshua King
(74) *Attorney, Agent, or Firm* — DORITY & MANNING, P.A.

(57) ABSTRACT

High-power, highly efficient 3-level system fiber lasers are described. The lasers can operate at an average power of about 50W or greater with an efficiency of about 60% or greater with low diffraction limited mode quality. The lasers incorporate an all-solid photonic bandgap fiber that includes a large core (20 micrometers or greater), a high core/clad ratio (greater than 15%), and a waveguide cladding designed to define a transmission band to suppress the 4-level system of the gain medium through determination of the node size of individual nodes of a cladding lattice.

17 Claims, 15 Drawing Sheets

(56) References Cited

U.S. PATENT DOCUMENTS

| | | | |
|---|---|---|---|
| 6,452,131 B2 | 9/2002 | Britnell | |
| 6,836,607 B2 | 12/2004 | Dejneka et al. | |
| 6,972,894 B2* | 12/2005 | Bjarklev | B82Y 20/00 359/332 |
| 7,209,619 B2* | 4/2007 | Dong | G02B 6/02357 385/127 |
| 7,280,730 B2 | 10/2007 | Dong et al. | |
| 7,340,140 B1* | 3/2008 | Xu | G02B 6/02357 385/127 |
| 7,349,611 B2* | 3/2008 | Broeng | G02B 6/02338 385/127 |
| 7,418,836 B2 | 9/2008 | Dong et al. | |
| 7,599,404 B2* | 10/2009 | Salin | H01S 3/06716 359/341.1 |
| 7,778,290 B2 | 8/2010 | Sacks et al. | |
| 7,792,394 B2 | 9/2010 | Dong et al. | |
| 7,876,495 B1* | 1/2011 | Minelly | G02B 6/02371 359/341.1 |
| 7,970,248 B2 | 6/2011 | Dong et al. | |
| 7,978,947 B2 | 7/2011 | Goto | |
| 8,045,259 B2* | 10/2011 | Petersson | G02B 6/0238 359/337.2 |
| 8,068,705 B2 | 11/2011 | Gapontsev et al. | |
| 8,159,742 B2 | 4/2012 | Dong et al. | |
| 8,285,098 B2 | 10/2012 | Dong et al. | |
| 8,285,099 B2 | 10/2012 | Dong et al. | |
| 8,564,877 B2* | 10/2013 | Goto | G02B 6/02347 359/341.1 |
| 9,146,345 B1* | 9/2015 | Dong | C03B 37/0128 |
| 11,269,137 B2* | 3/2022 | Kiani | G02B 6/02052 |
| 2002/0181512 A1* | 12/2002 | Wang | G02B 6/4204 372/6 |
| 2004/0233941 A1* | 11/2004 | Fajardo | H01S 3/0675 372/6 |
| 2005/0105867 A1* | 5/2005 | Koch, III | G02B 6/02338 385/125 |
| 2005/0157998 A1* | 7/2005 | Dong | G02B 6/02361 385/127 |
| 2009/0207483 A1 | 8/2009 | Goto | |
| 2010/0254669 A1 | 10/2010 | Takenaga et al. | |
| 2011/0007760 A1* | 1/2011 | Clowes | H01S 3/2308 372/6 |
| 2011/0141757 A1* | 6/2011 | Taru | G02B 6/0238 385/39 |
| 2011/0188825 A1* | 8/2011 | Alkeskjold | B29D 11/00663 264/1.24 |
| 2011/0292952 A1* | 12/2011 | Boullet | H01S 3/09415 372/6 |
| 2014/0055844 A1* | 2/2014 | Cormier | H01S 3/094053 359/345 |
| 2015/0349481 A1 | 12/2015 | Kliner | |
| 2016/0099539 A1* | 4/2016 | Creeden | H01S 3/06716 359/328 |
| 2017/0229834 A1* | 8/2017 | Pax | G02B 6/14 |
| 2017/0229838 A1* | 8/2017 | Dawson | G02B 6/02338 |

OTHER PUBLICATIONS

Paschotta, "Photonic Crystal Fibers", RP Photonics Encyclopedia [online], Archived on Aug. 22, 2018, Retrieved on Jan. 28, 2023, Retrieved from the Internet:<URL: https://web.archive.org/web/20180822165111/https://www.rp-photonics.com/photonic_crystal_fibers.html>. (Year: 2018).*
Aleshkina, et al. "Photodarkening-Free Yb-Doped Saddle-Shaped Fiber for High Power Single Mode 976-nm Laser" *IEEE Photon. Tech. Lett.* 30 (2018) pp. 127-130.
Aleshkina, et al. "5.5W monolithic single-mode fiber laser and amplifier operating near 976 nm" *Proc. SPIE* 9728 (2016) pp. 1-8.
Birks, et al. "Approximate band structure calculation for photonic bandgap fibres" *Opt. Exp.* 14 (2006) pp. 9483-9490.
Boullet, et al. "High power ytterbium-doped rod-type three-level photonic crystal fiber laser" *Opt. Exp.* 16 (2008) pp. 17891-17902.
Dajani, et al. "Experimental and theoretical investigations of photonic crystal fiber amplifier with 260W output" *Opt. Exp.* 17 (2009) pp. 24317-24333.
Dong, et al. "Large-Mode-Area All-Solid Photonic Bandgap Fibers for the Mitigation of Optical Nonlinearities" *IEEE J. Sel. Top. Quant. Electron.* 22:4900207 (2016) pp. 316-322.
Dong, L. "A vector boundary matching technique for efficient and accurate determination of photonic bandgaps in photonic bandgap fibers" *Opt. Exp.* 19 (2011) pp. 12582-12593.
Dong, L. "Specialty optical fibers for applications in fiber lasers" *OSA Adv. Sol. State Photon.* JWA1 (2011) pp. 1-3.
Dong, et al. "Advanced Specialty Fiber Designs for Fiber Lasers" *Proc. SPIE* 7914:791415 (2011) pp. 1-15.
Dong, L. "Specialty fibers and their applications in fiber lasers" $2^{nd}$ *Workshop Spec. Opt. Fib. Appl.* 7839:783902 (2010) pp. 1-4.
Dong, L. "Limits of stimulated Brillouin scattering suppression in optical fibers with transverse acoustic waveguide designs" *J. Lightwave Tech.* 28 (2010) pp. 3156-3161.
Dong, L. "Formulation of a complex mode solver for arbitrary circular acoustic waveguides" *J. Lightwave Tech.* 28 (2010) pp. 3162-3175.
Fan, et al. "High power Yb-doped photonic bandgap fiber oscillator at 1178 nm" *Opt. Exp.* 20 (2012) pp. 14471-14476.
FMI. "Fiber Laser Market: Elevating Frequency of Conventional Laser Replacements in Material Processing Applications to Support Growth: Global Industry Analysis 2013-2018 and Opportunity Assessment, 2019-2027" *Fut. Mkt. Insights* (2018) pp. 1-5.
Gu, et al. "Extending Mode Areas of Single-mode All-solid Photonic Bandgap Fibers" *Opt. Exp.* 23 (2015) pp. 9147-9156.
Gu, et al. "Ytterbium-doped large-mode-area all-solid photonic bandgap fiber lasers" *Opt. Exp.* 22 (2014) pp. 13962-13968.
Kong, et al. "Efficient 240W single-mode 1018nm laser from an Ytterbium-doped 50/400μm all-solid photonic bandgap fiber" *Opt. Exp.* 26 (2018) pp. 3138-3144.
Kong, et al. "Mode Area Scaling with All-solid Photonic Bandgap Fibers" *Opt. Exp.* 20 (2012) pp. 26363-26372.
Leich, et al. "Tapered large-core 976 nm Yb-doped fiber laser with 10 W output power" *Laser Phys. Lett.* 11:045102 (2014) pp. 1-7.
Li, et al. "151W monolithic diffraction-limited Yb-doped photonic bandgap fiber laser at ~978nm" *Opt. Exp.* 27:24972 (2019) pp. 1-6.
Martinez, et al. "Ch. 5: Carbon nanotube and graphene-based fiber lasers" *Carbon Nanotubes and Graphene for Photonic Applications* Woodhead Publ. Ltd. (2013) pp. 121-143.
Matniyaz, et al. "Highly efficient cladding-pumped single-mode three-level Yb all-solid photonic bandgap fiber lasers" *Opt. Lett.* 44 (2019) pp. 807-810.
Nilsson, et al. "Ring-doped cladding-pumped single-mode three-level fiber laser" *Opt. Lett.* 23 (1998) pp. 355-357.
Olausson, et al. "167W, power scalable ytterbium-doped photonic bandgap fiber amplifier at 1178 nm" *Opt. Exp.* 18 (2010) p. 16345-16352.
Paschotta, R. "High-power Fiber Lasers and Amplifiers" *RP Photonics Encycl.* (2020) pp. 1-11.
Paschotta, R. "Four-level and Three-level Gain Media" *RP Photonics Encycl.* (2018) pp. 1-6.
Pulford, et al. "400-W near diffraction-limited single-frequency all-solid photonic bandgap fiber amplifier" *Opt. Lett.* 40 (2015) pp. 2297-2300.
Pureur, et al. "Ytterbium-doped solid core photonic bandgap fiber for laser operation around 980 nm" *Appl. Phys. Lett.* 92:061113 (2008) pp. 1-3.
Röser, et al., "94W 980 nm high brightness Yb-doped fiber laser" *Opt. Exp.* 16 (2009) pp. 17310-17318.
Shaikh, et al. "Fiber Laser Market Expected to Reach $4,403 Million, by 2025" *Allied Mkt. Res.* (2018) pp. 1-6.
Shirakawa, et al. "High-power Yb-doped photonic bandgap fiber amplifier at 1150-1200 nm" *Opt. Exp.* 17 (2009) pp. 447-454.
Soh, et al. "A 4.3W 977 nm ytterbium-doped jacketed-air-clad fiber amplifier" *Adv. Sol. State Las.* MA3 (2004).
Suzuki, et al "Highly ytterbium-doped silica fibers with low photodarkening" *Opt. Exp.* 17 (2009) pp. 9924-9932.
Tyrrell, M. "The benefits of fibre lasers to aerospace manufacturers" *Aerospace Mfg.* (2018) pp. 1-3.

(56) References Cited

OTHER PUBLICATIONS

Wang, et al. "Three-level Neodymium Fiber Laser Incorporating Photonic Bandgap Fiber" *Opt. Exp.* 31 (2006) pp. 1388-1390.

* cited by examiner

THREE-LEVEL SYSTEM FIBER LASERS INCORPORATING AN ALL-SOLID PHOTONIC BANDGAP FIBER

CROSS REFERENCE TO RELATED APPLICATION

This application claims filing benefit of U.S. Provisional Patent Application Ser. No. 62/925,966, having a filing date Oct. 25, 2019, which is incorporated herein by reference in its entirety.

FEDERAL RESEARCH STATEMENT

This invention was made with Government support under Grant No. W911NF-17-1-0454, awarded by the Joint Directed Energy Transition Office and the U.S. Army Research Office. The Government has certain rights in the invention.

BACKGROUND

The characteristics of most radiative emissions are determined by the intrinsic nature of the active species and the microscopic environment immediate to the active species. Laser emissions, however, can be controlled by a macroscopic environment. For instance, the development of photonic bandgap fibers (PBF) has made laser emission wavelength control possible by allowing only certain wavelengths to be confined in the laser cavity. The impact of this has been significant, as it has been used to provide laser architectures that enable many new wavelengths of efficient laser operations and consequently many new applications.

Fiber lasers have been one of the most successful technology commercialization stories of the past two decades. They are critical manufacturing tools used in many industries for marking, engraving, scribing, sintering, heat treating, dicing, trimming, cutting, welding, and material processing, as well as in many medical, scientific, and defense applications. Unfortunately, fiber lasers are limited in providing the high peak powers required for many other potential applications, such as micromachining applications. This is primarily due to the strong nonlinearities in the tightly confined small core at high peak powers.

Ytterbium (Yb) solid-state lasers are ideal candidates to overcome many limitations of fiber lasers due to the possibility of a large beam size. All-solid double-clad photonic bandgap fibers (AS-PBFs) have been used to suppress Yb-amplified spontaneous emission (ASE) at shorter wavelengths, enabling high-power lasers above 1150 nm. AS-PBFs have also been formed that can enable efficient Yb fiber lasers at about 1018 nm by suppressing Yb ASE at the longer wavelengths. Many applications, such as industrial micromachining applications, also require lasers capable of single-mode operation at powers in excess of 100 W at smaller wavelengths, such as about 980 nm, as pump lasers for pulsed solid-state lasers.

Many gain mediums common in fiber lasers exhibit competing 4-level and 3-level emission systems. FIG. 1 illustrates the competing transitions for Yb-doped gain mediums, which is one such material. Yb fiber lasers operate in the 1030 nm to 1080 nm wavelength range via the 4-level system but can also operate at about 976 nm via the competing 3-level system. As shown in FIG. 1, in a 3-level system, the laser transition ends on the ground state. In addition, the unpumped gain medium exhibits strong absorption on the laser transition (FIG. 2), and a population inversion and, consequently, net laser gain will result only when more than half of the active material is pumped into the upper laser level. As a result, the threshold pump power for a 3-level system is fairly high. In the competing 4-level system, a lower threshold pump power can be achieved in which the lower laser level of the transition is well above the ground state and is quickly depopulated, e.g., by multi-phonon transitions. Ideally, no appreciable population density in the lower laser level will occur even during laser operation, and reabsorption of the laser radiation is avoided (provided that there is no absorption on other transitions). As such, there is no absorption of the gain medium in the unpumped state. Due to such features, the 4-level transition system has been foundational for industrial high-power fiber lasers.

3-level systems have been examined for use in certain applications (e.g., amplifiers in dense wavelength-division-multiplexing optical communication systems and ultrafast solid-state fiber lasers) but have not been heavily pursued as 3-level systems display poor efficiencies and low powers in practical laser configurations. Conventional methods for mitigating these issues have been based on cladding pumping and large core-to-cladding ratios, which lower the intensity of the laser relative to that of the pump, thereby allowing the required high inversion to be maintained at relatively lower pump powers. This conventional approach results in reduced unused pump (i.e., residual pump) but produces only limited performance improvements in practical high-power fiber lasers, since single-mode operation sets an upper limit on core diameter and a large core-to-cladding ratio therefore sets an upper limit on cladding size, and consequently, available pump powers.

Ideally, to obtain a fiber laser that operates at high power in the 3-level system regime, the competing 4-level system should be suppressed. Unfortunately, the separation of the laser emission wavelength and the ASE peak wavelength is often quite small, e.g., about 50 nm, in an Yb system, and 4-level system suppression presents a significant challenge. Moreover, to suppress the operation of the 4-level system, higher inversion is required and has to be maintained throughout the fiber, causing a large amount of the pump to leave the fiber and to detrimentally affect the power and efficiency ratings. For instance, the most advanced practical Yb laser systems currently known can only provide a few watts of single-mode power at 976 nm at low pumping efficiencies. The inability to suppress the 4-level system, while maintaining high power output, high efficiency, and good mode quality, for the competing 3-level system severely limits the growth of many laser-based industrial applications.

What is needed in the art is a method for forming all-solid photonic bandgap fibers that can suppress the 4-level system transitions of the gain medium. 3-level system fiber lasers incorporating such PBF that can operate at high power with high pumping efficiency and good beam quality would be of great benefit.

SUMMARY

According to one embodiment, disclosed is a 3-level system fiber laser that includes an optical pump and an all solid, single-mode photonic bandgap fiber (PBF) in optical communication with the pump. The PBF includes a core, a waveguide cladding external to the core, and a pump cladding external to the waveguide cladding. The core has a first cross-sectional dimension of about 20 micrometers ($\mu$m) or greater and includes a gain medium capable of operating as a 4-level system having a first emission wavelength and also as a competing 3-level system having a second emission wavelength. The waveguide cladding has a second cross-sectional dimension, and the ratio of the first cross-sectional dimension to the second cross-sectional dimension is 15% or greater. The waveguide cladding includes a series of nodes surrounded by a background material. The waveguide cladding defines a transmission band of the PBF. The first emission wavelength falls outside of the transmission band, and the second emission wavelength falls within the transmission band. The 3-level system fiber laser can deliver a laser signal at or near the second emission wavelength at an average power of about 50 Watts or greater and with a power efficiency of about 60% or greater and/or a diffraction limited mode quality ($M^2$) of about 1.3 or less.

Also disclosed is a method for forming a 3-level system fiber laser. A method can include forming a solid, single-mode photonic bandgap fiber (PBF) to include a core with a first cross-sectional dimension of about 20 μm or greater. The PBF core includes a gain medium capable of operating as a 4-level system having a first emission wavelength, and as a competing 3-level system, having a second emission wavelength (e.g., an Yb-doped core). The method also includes forming a waveguide cladding external to the core. The waveguide cladding includes a series of nodes surrounded by a background material, and the individual nodes of the wave-guide cladding are designed (e.g., having a predetermined size) such that the PBF defines a transmission band with the first emission wavelength falling outside of the transmission band and with the second emission wavelength falling within the transmission band. The waveguide cladding is formed to have a second cross-sectional dimension, and the ratio of the first to the second cross-sectional dimensions is 15% or greater. A method can also include forming a pump cladding external to the waveguide cladding.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
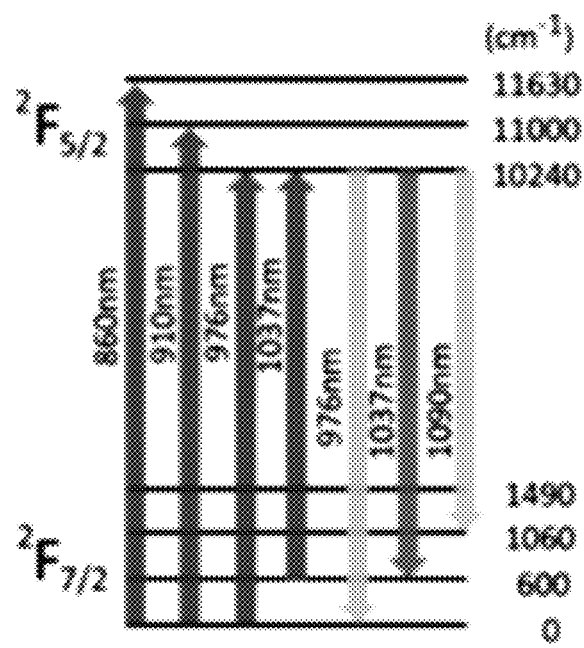
FIG. 1 illustrates the energy levels for Yb-doped gain medium, including the competing 3-level system and 4-level system transitions.
Figure 2:
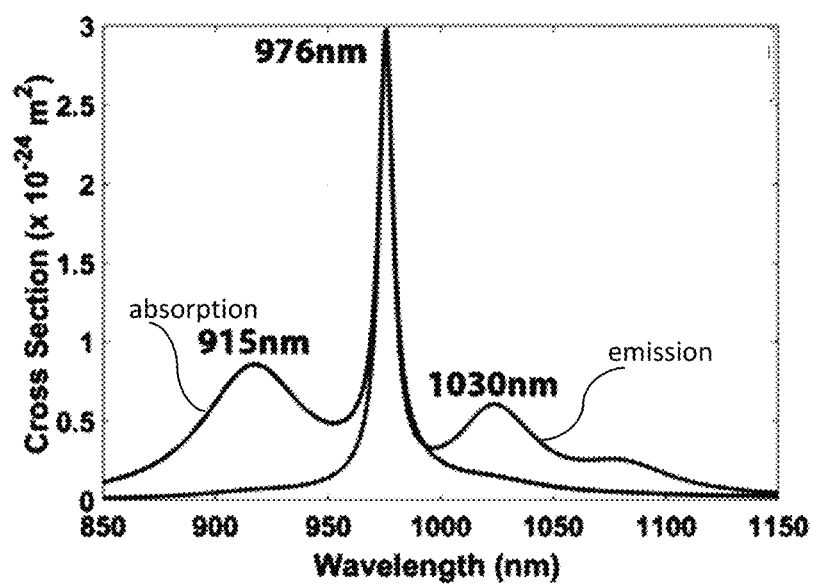
FIG. 2 illustrates the absorption and emission cross-sections for Yb-doped gain medium.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are efficient 3-level system fiber lasers and methods for forming the fiber lasers. The fiber lasers incorporate an all-solid photonic bandgap fiber (PBF) that can be designed so as to inhibit transmission over a predetermined wavelength range and thereby suppress the competing and more efficient 4-level system of the gain medium. 3-level system single mode fiber lasers as described can operate at high power and high-power efficiency with diffraction limited mode quality. For instance, disclosed fiber lasers can operate at an average power of about 50 W or greater, such as about 70 W or greater, about 80 W or greater, about 100 W or greater, or about 150 W or greater in some embodiments, such as from about 50 W to about 200 W. In addition, the fiber lasers can have very high peak powers of about 100 W or greater, about 200 W or greater, or up to several hundred Watts in some embodiments. Beneficially, disclosed fiber lasers can provide high power with high-power efficiencies, generally greater than about 60%, or greater than about 70% in some embodiments. As utilized herein, the term "power efficiency" is intended to refer to the power output of a laser relative to the coupled pump power of the laser. Disclosed 3-level system fiber lasers can also provide a diffraction limited beam, with a $M^2$ of about 1.3 or less, about 1.2 or less, or about 1.1 or less in some embodiments.

The all-solid PBF can provide major benefits to 3-level system fiber lasers incorporating the fibers. For example, they allow robust single-mode operation of coiled fibers at large core cross-sectional dimensions (e.g., diameters), and therefore, enable large core-to-cladding ratio. In addition, through design of the waveguide cladding of the fibers, the fibers provide efficient suppression of the 4-level system by distributed loss arising from placing these lasing wavelengths outside the bandgap. Moreover, as the PBF are flexible, they can be readily integrated into all-fiber monolithic fiber lasers, unlike previously known rod-type photonic crystal fibers. In addition, the 3-level systems described herein can be mostly inhomogeneously broadened with a full width at half maximum (FWHM) bandwidth of about 1 to about 2 nm in some embodiments.

Figure 3:
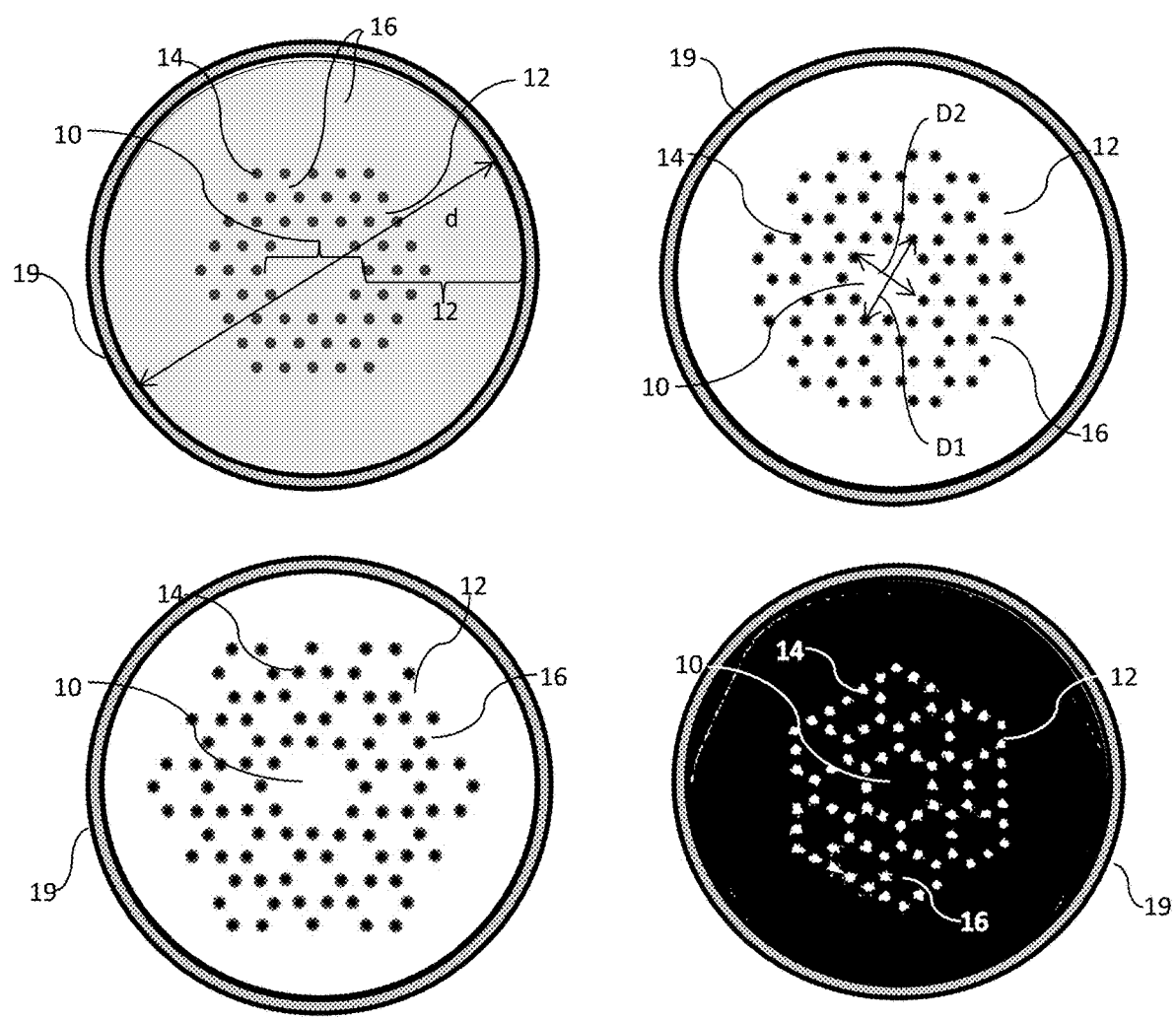
FIG. 3 illustrates several different designs for PBF as described herein.

FIG. 3 schematically illustrates several different embodiments of PBF as may be incorporated in a 3-level system fiber laser as described herein. As illustrated, the PBF can include a solid core 10, a solid waveguide cladding 12, and a pump cladding 19. The solid waveguide cladding 12 includes a number of nodes 14 surrounded by a background material 16 that together form a cladding lattice. As shown in FIG. 3, the cladding lattice including the nodes 14 surrounded by the background material 16 can extend from an outer boundary of the solid core 10 and across the cross-sectional dimension d of the PBF to the inner boundary of the pump cladding 19, with an outer portion of the waveguide cladding 12 being formed of only the background material 16 and absent of nodes 14. This is not a requirement of disclosed PBF, and in other embodiments, the waveguide cladding 12 can include a node lattice across the entire waveguide cladding from the boundary with the core 10 to the outer boundary of the waveguide cladding 12 with the pump cladding 19.

Figure 6:
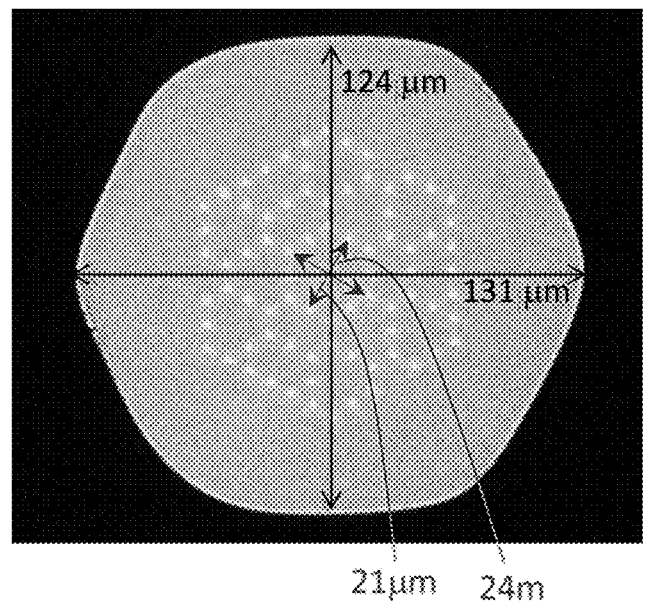
FIG. 6 presents the cross-section of an Yb-doped PBF fiber used in the Examples section.

The core 10 and the waveguide cladding 12 can have a cross-sectional shape of any suitable geometry. For instance, the core 10 of each fiber of FIG. 3 is hexagonal. Other core cross-sections can be formed, however, including circular or non-circular cores including polygons of any number of sides. In addition, in those embodiments in which the core has a polygonal cross-section, the individual sides of the polygon can be equal to one another or can differ. Likewise, for the waveguide cladding 12, the outer cross-section can be circular, as in the PBF of FIG. 3, or can be non-circular, including D-shaped, elliptical, polygonal (e.g., rectangular or hexagonal), etc., one embodiment of which is illustrated in FIG. 6. In addition, the core 10 can be centered within the waveguide cladding 12 or can be off-centered, as is known.

The PBF of disclosed laser systems can include a core 10 having a relatively large cross-sectional dimension to allow robust single-mode operation. For instance, the core 10 can have a cross-sectional dimension of about 20 μm or greater, about 25 μm or greater, about 30 μm or greater, or about 40 μm or greater in some embodiments. In some embodiments, the core 10 can have a cross-sectional dimension of about 100 μm or less. In addition, the core/cladding ratio of disclosed fibers can be 15% or greater, or about 20% or greater in some embodiments. As utilized herein, the core/cladding ratio refers to a cross-sectional dimension of the core (e.g., a diameter) and a cross-sectional dimension of the fiber that spans the core and the cladding (e.g., the dimension "d" in FIG. 3).

In the present disclosure, geometric relationships of a PBF that includes a non-circular core and/or clad, e.g., an ovoid or polygonal core and/or clad, can be determined using the smallest cross-sectional dimension of the area. For instance, in the PBF of FIG. 3, each PBF illustrated has a corner-to-corner core dimension D1 and a side to side core dimension D2. As utilized herein, a defined cross-sectional dimension of such a fiber can be understood to refer to the smallest of the cross-sectional dimensions of the non-circular area (D2 in the illustrated examples of FIG. 3). Thus, the core/clad ratio of a PBF that includes a non-circular core and/or clad refers herein to the ratio of the shortest cross-sectional dimension of the core (e.g., D2 in FIG. 3) to the shortest cross-sectional dimension that crosses the entire waveguide cladding and the core surrounded by the waveguide cladding (e.g., d in FIG. 3).

The PBF can include a one or more laser active ion dopants in the core 10 to provide the gain medium of the fiber. In one embodiment, the 3-level system fiber lasers can utilize an Yb-based fiber gain medium. As discussed previously, the 3-level system of Yb-based fiber lasers having emission at approximately 976 nm has attracted much attention, as high-powered diffraction-limited systems in a range around this emission (e.g., from about 975 nm to about 985 nm) could be utilized in new applications such as micromachining applications. Moreover, high-powered 976 nm fiber lasers as described herein can also be frequency-doubled to 488 nm for additional applications such as pumping Ti: Sapphire lasers near its peak absorption and underwater applications such as communications and sensing.

It should be understood, however, that disclosed systems are in no way limited to Yb-based lasers. Specifically, other active materials are encompassed herein, and disclosed methods can be applied to provide other 3-level systems that can generate efficient and high-power lasers at many new wavelengths. By way of example and without limitation, the gain medium of a PBF utilized in disclosed lasers can incorporate laser active ion dopants including, and without limitation to, neodymium, ytterbium, erbium, thulium, praseodymium, and holmium, as well combinations of one or more laser active dopants.

The core 10 can include the active material as a dopant in any suitable host material including crystals, glasses, or semi-conductors as are known in the art. For instance, the core 10 can include host material such as, and without limitation to, oxides of silicon, germanium, aluminum, boron, phosphorus, titanium, alkali- and alkali-earth metals, as well as similar glasses. Furthermore, the core 10 can also include one or more dopant materials in addition to the active material, such as fluorine (F), chlorine (Cl), chromium (Cr), nickel (Ni), selected rare earth elements, transition metals, and so forth.

In one embodiment, the core 10 can be designed to mitigate photo-darkening, which is an issue with certain gain mediums, such as Yb-based fiber lasers due to their high inversions. In one embodiment, photo-darkening can be mitigated by incorporating aluminum (Al) in the core with a high Al-to-Yb ratio (e.g., about 3 or greater), or alternatively, by including both cerium (Ce) and Al doping in the core. In another embodiment, the carrier material of the core can include phosphosilicate glass, which has demonstrated good photo-darkening suppression (Suzuki, et al., Optics Express, Vol. 17, No. 12, Jun. 8, 2009, pp. 9924-9932).

As illustrated, the PBF include a series of nodes 14 in the waveguide cladding. The nodes 14 of the waveguide cladding are designed to define the bandgap of the fibers and thereby suppress transmission of the 4-level system of the gain medium. For example, through design of the cross-sectional dimension of the nodes 14, the bandgap of a PBF can be shifted to ensure that the 3-level system emission is within the transmission band and the 4-level system emission is outside of the transmission band. In general, the individual nodes 14 of a PBF can have a cross-sectional dimension of about 0.5 μm or more; for instance, about 1 μm in some embodiments, such as from about 0.5 μm to about 10 μm, or from about 1 μm to about 5 μm. In addition, the individual nodes 14 of a waveguide cladding do not need to have the same dimensions as one another.

The nodes 14 of the waveguide cladding 12 can be arranged in any two-dimensional pattern in the cross-sectional dimension of the PBF, such as a linear pattern, a triangular lattice pattern, a honeycomb lattice pattern, a square lattice pattern, or a rectangular pattern structure, examples of which are provided in FIG. 3. In addition, the pitch (i.e., the center-to-center distance between adjacent nodes 14) can generally be between about 2 μm and about 20 μm; for instance, from about 3 μm and about 15 μm, or from about 5 μm and about 10 μm, in some embodiments. It should be understood, and as illustrated in FIG. 3, the nodes do not need to be arranged with identical pitch between all nodes.

In some embodiments, the waveguide cladding 12 can include multiple different spacing between individual nodes 14, e.g., smaller spacing (minimum pitch) between selected nodes and larger spacing (maximum pitch) between selected nodes, with other pitch widths in between, if desired, so as to form a cladding lattice having a cladding design with larger and smaller background areas 16 surrounded by nodes 14. In general, in such an embodiment, the largest background spaces will be smaller in cross-sectional area than the core 10, so as to minimize fundamental mode loss in the PBF.

The pattern of the individual nodes 14 forming the cladding lattice will not generally affect the location of the bandgap, and the size of the individual nodes 14 of the cladding lattice will be the primary parameter used to control the bandgap location. However, the pattern of the cladding lattice can be utilized to define the core cross-sectional dimension and maximize the core-to-clad ratio for the core cross-sectional dimension.

The nodes 14 and the background 16 can differ in refractive index, and the nodes 14 and the core 10 can differ in refractive index. In addition, the refractive index of the background 16 can be the same or differ from the refractive index of the core 10. For instance, in one embodiment, the background 16 and the core 10 can be formed of the same material but for the presence of the active material in the core 10.

At least a portion of the nodes 14 can have a higher refractive index as compared to the background 16. Dopants, as are generally known, can be utilized to control the optical indices of the core 10, background 16, and nodes 14. For instance, germanium, phosphorous, and titanium are known to cause an increase in refractive index (decrease in light velocity), while boron and fluorine cause a decrease in refractive index (increase in light velocity). By way of example, in one embodiment, the background 16 can be formed of silica and the nodes 14 can be formed of silica doped with a material, e.g., germanium oxide ($GeO_2$), that can increase the refractive index of the nodes 14 as compared to the background 16.

The relationship between the refractive index of the nodes 14 and the background 16 can be described by the relative node index which is defined as $$\Delta(\%) = ((n_h^2 - n_b^2)/(2n_h^2)) \times 100$$

in which:
$\Delta$ is the relative node index,
$n_h$ is the refractive index of the nodes 14 (In those embodiments in which the nodes are not all identical to one another, $n_h$ refers to the highest refractive index material of the nodes), and
$n_b$ is the refractive index of the background 16.

The relative node index can generally be between about 0.5% and about 5%; for instance, between about 1% and about 4%.

Referring again to FIG. 3, a PBF can also include a pump cladding 19. During use, pump energy can be injected into the pump guide to pump active ions in the core 10, and the pump cladding 19 can have an effective lower refractive index as compared to the background 16 that can be developed either by using, e.g., a low index material such as a fluorine-doped silica glass, or a suitable polymer coating such as a low index acrylate, or air-hole structures comprised mainly of air and a small amount of a glass. The presence of the pump cladding can restrict the pump light essentially to the waveguide cladding 12.

In one embodiment, the PBF can be formed according to a fiber drawing process. For instance, a preform can first be formed including multiple rods, each rod corresponding to a portion of the core or a clad, with the rods arranged in the desired geometry to build a preform stack, as is known. Following arrangement of the rods to form the preform stack, the preform stack can be placed into a furnace to fuse the rods and form a cane. In one embodiment, the cane can be surrounded by an outer cylinder, e.g., a cylinder of a low-index glass, that can form the pump cladding of the final fiber. In other embodiments, the pump cladding can be formed from capillaries in the preform. The cane can then be sealed in a larger tube; for instance, with a cap mounted at one end for the vacuum connection. A vacuum can then be connected so as to dry and purge the fused preform, and the PBF can be drawn. In one alternative embodiment, multiple canes (for instance, from a few millimeters to a few centimeters in diameter) can be individually drawn, and the canes can then be subsequently drawn to form a fiber.

The preform can be drawn into the PBF according to standard methodology, such as via a fiber drawing tower that includes a hot zone. The hot zone can apply heat that is sufficient to soften the pump cladding, the waveguide cladding, the core, and any other sections of the preform. Temperatures for the hot zone during a drawing process can depend upon materials included in the preform, the size of the preform, and the targeted size for the fiber, as is known. For example, the draw temperature at which the core and the waveguide cladding are at a viscosity to provide an acceptable draw can be between about 1500° C. and about 2200° C.; for instance, between about 1925° C. and about 2050° C., in one embodiment.

In general, the draw can be carried out under an inert atmosphere and the preform can be drawn from a first end to form the PBF that can then be collected; for instance, wound on a mandrel.

Laser systems, as may incorporate the PBF fibers, can encompass any suitable design, such as and not limited to, laser systems utilizing any 4-level system as is known. For instance, a laser system can be single pumped or double pumped with counter-pumping or co-pumping as is known. In one embodiment, a 3-level system laser incorporating the PBF fibers can utilize a monolithic fiber laser design, but this is not a requirement of disclosed systems, and in other embodiments, a free-space design can be utilized. A monolithic fiber laser design can be preferred, in some embodiments, in which all fibers of the system are fully spliced without any free-space optics as there are no movable parts in this design, and furthermore, the high-power optical beam can remain fully inside the flexible fibers. This can improve robustness, stability, and reliability of a fiber laser. Moreover, once splicing procedures are established in a monolithic fiber laser design, there are no adjustments necessary in a production process, which can lower cost and improve repeatability of laser production.

Figure 4:
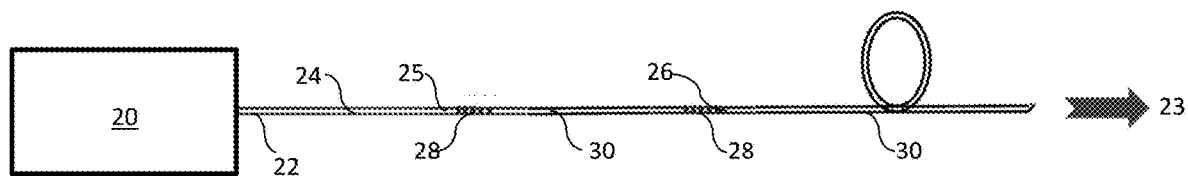
FIG. 4 schematically illustrates one embodiment of a 3-level system fiber laser as described herein.

One embodiment of a 3-level system laser is illustrated in FIG. 4. In this embodiment, the laser can include a single pump diode 20 coupled to a delivery fiber 22, e.g., a fiber including a silica core and a doped silica cladding, such as a fluorine-doped silica cladding. The delivery fiber can be a typical pump delivery fiber, such as a 105/125 pump delivery fiber having a 105 μm core and a 125 μm fiber diameter. The system can also include an isolation fiber 24, e.g., an erbium (Er)-doped fiber, for isolation of the laser from the pump diode. The system can include one or more PBF 30, as described herein, with suitable couplers including photosensitive fibers 25, 26, which can vary depending upon the nature of the coupling (e.g., reflective vs. output) and fiber Bragg gratings 28 (FBG) as are known in the art. Such a single-pumped system can deliver a laser output 23 at a power of, e.g., about 50 W to about 150 W, with high pumping efficiency, e.g., about 60% or greater.

Figure 5:
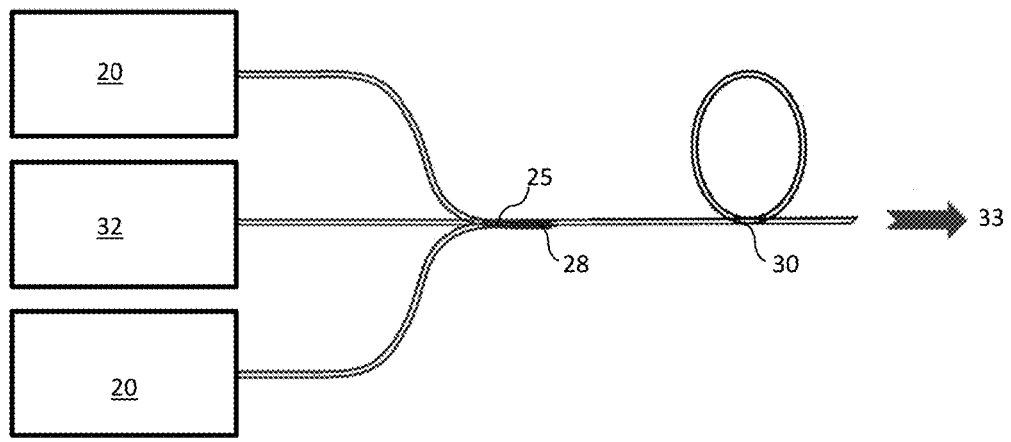
FIG. 5 schematically illustrates one embodiment of a 3-level system fiber laser as described herein.

In another representative embodiment, illustrated in FIG. 5, a 3-level system laser can be a double-pumped system. As illustrated, this system includes two pump diodes 20 and can optionally also include a seed laser 32 that can inject light at the output wavelength. The system can also include a coupler, including a photosensitive fiber 25 and an FBG 28, as known, that can couple the input beams to the PBF 30. The output 33 of a double-pumped system can be quite high; for instance, about 150 W or greater, or about 200 W or greater in some embodiments, while maintaining high pumping efficiency, e.g., about 60% or greater. In those embodiments in which the seed laser 32 is used, the photosensitive fiber 25 and an FBG 28 will not be used.

The output of a system can then be utilized in any suitable fashion. By way of example, in one embodiment, the output of the laser, 23 (FIG. 4), 33 (FIG. 5), can be utilized to pump a solid-state laser.

The present disclosure may be better understood with reference to the Examples set forth below.

Example 1

An all-solid PBF including an Yb-doped gain medium was formed. The cross-section of the PBF fiber is shown in FIG. 6. The fiber had a polygonal core with corner-to-corner cross-sectional dimension of 24 μm and side-to-side cross-sectional dimension of 21 μm. The polygonal wave-guide cladding had a corner-to-corner cross-sectional dimension of 131 μm and side-to-side cross-sectional dimension of 124 μm, as shown in FIG. 6. A multiple-cladding-resonance design was used for enhanced higher-order-mode suppression to provide robust single-mode operation in the core. The fiber was coated with low index acrylate as a pump cladding to provide a pump numerical aperture (NA) of about 0.46.

The bandgap position in wavelength was adjusted as described to provide low loss in the core for the desired 3-level laser operation at approximately 976 nm and high loss in the core for the 4-level laser operation above 1010 nm.

The core was formed of 0.5 mol % Yb-doped phosphosilicate glass. The nodes in the wave-guiding cladding were formed of approximately 20 mol % germanium-doped silica with a peak NA of 0.27, each with a node having a diameter of about 1.3 μm. The nominal center-to-center separation between adjacent nodes was about 6.1 μm. The background areas were formed of silica. The pump cladding was formed of low-index acrylic (not shown in FIG. 6). The pump absorption was measured to be about 1.76 dB/m at 915 nm.

Figure 7:
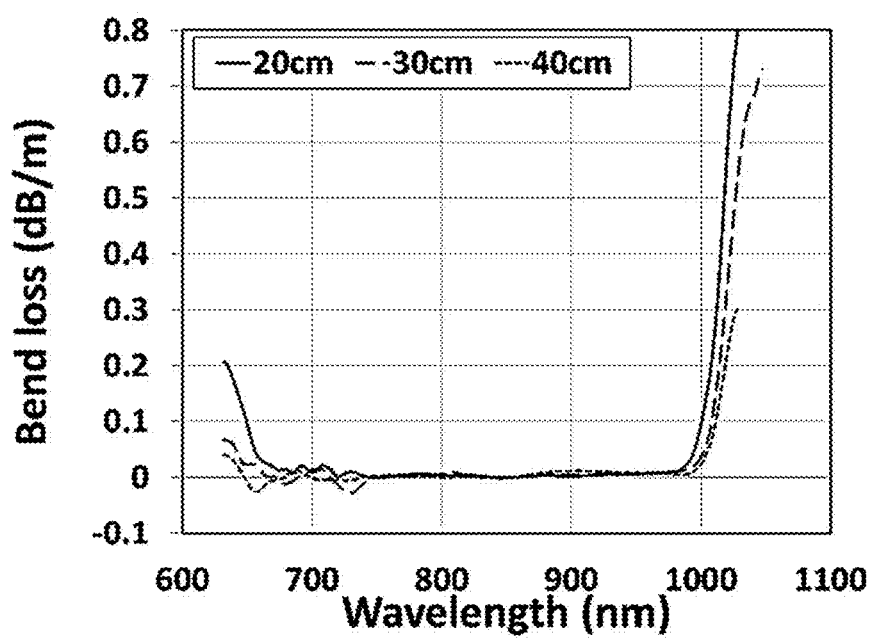
FIG. 7 presents the bend loss measured from a passive PBF (coil diameters are shown in the legend).

To form the fiber, a passive fiber of identical material design was initially formed, and its bandgap position was modified as necessary to obtain the target dimensions for the active fiber. The background loss for core propagation in the passive fiber was measured to be around 20 dB/km at about 976 nm. Bend loss was also measured on the passive fiber for bend diameters of 20 cm, 30 cm and 40 cm. Results are provided in FIG. 7, showing negligible bend loss for coil diameters of 20 cm at the lasing wavelength of approximately 976 nm. The high bend loss at the longer wavelengths is related to the long wavelength edge of the bandgap, which was optimally positioned for the suppression of the Yb 4-level system without incurring loss on the 3-level system at 976 nm. The low-loss window was measured to be around 400 nm wide in a passive fiber and the lower wavelength edge of the bandgap was ~650 nm for the active fiber.

Figure 8:
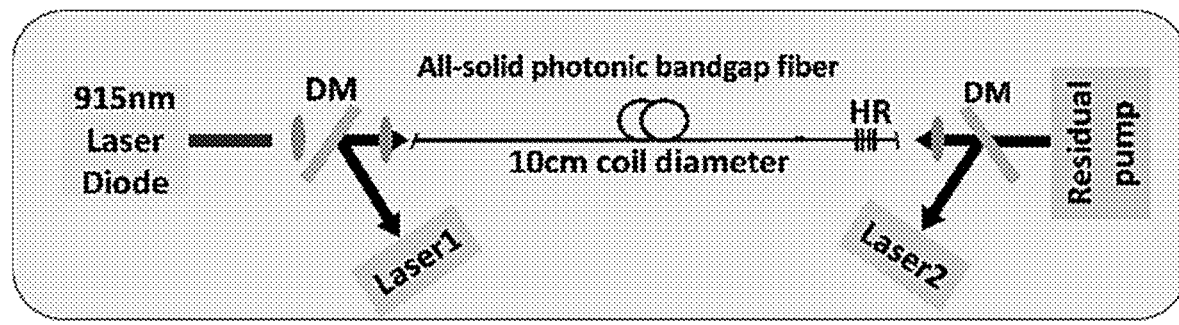
FIG. 8 illustrates a laser configuration used in the Examples section.

The basic laser arrangement was a counter-pumped configuration shown in FIG. 8. DM on the figure refers to a dichroic mirror and HR refers to the fiber Bragg grating (FBG) high reflector (>99.5%). A few other alternative arrangements were also used including 4%+4%: straight cleaves at both fiber ends; 4%+HR: straight cleave at the pump end and HR at the other end; 1%+HR: 1% FBG output coupler at the pump end and HR at the other end; angle+HR: angled cleave at the pump end and HR at the other end; angle+angle: angled cleaves at both ends. FBGs were written in-house using a frequency-quadrupled YAG laser at 266 nm. A matching 25/125 μm photosensitive fiber was made in-house for the HR FBGs. The all-solid PBF could be easily spliced like conventional fibers. For some arrangements, several different fiber lengths were also tested. This was done by repeatedly cutting back the same fiber. The coil diameter was 10 cm in all cases. Several coil sizes were tested down to 10 cm and very little efficiency degradation was found at 10 cm. Outputs at both fiber ends were monitored along with residual pump. The pump was delivered in a 0.22 NA 105/125 μm fiber. A 100 W 915 nm pump diode was initially used.

The power efficiency of the laser was simulated using a homemade MATLAB® code taking account of local pump, signal, and ASE powers in both directions, as well as local inversion. All of the optical powers were initially propagated forward numerically with appropriate boundary conditions at the fiber input and guessed values were used for all other parameters which could not be determined. Once the propagation reached the fiber end, only the appropriate parameters at the output end were reset by the required boundary conditions and all the optical powers propagated numerically backward. Once the input was reached, only the appropriate parameters at the input were reset by the required boundary conditions. This was repeated until numerical convergence was achieved. The simulation was performed for 4%+4%, 4%+HR, and 1%+HR, shown in FIG. 9. Both outputs were considered for the efficiency calculations. The efficiencies were very close in these three simulations. There was only a small difference for shorter fibers, mostly due to the different total cavity losses, with lower total cavity loss leading to slightly higher efficiency.

Figure 9:
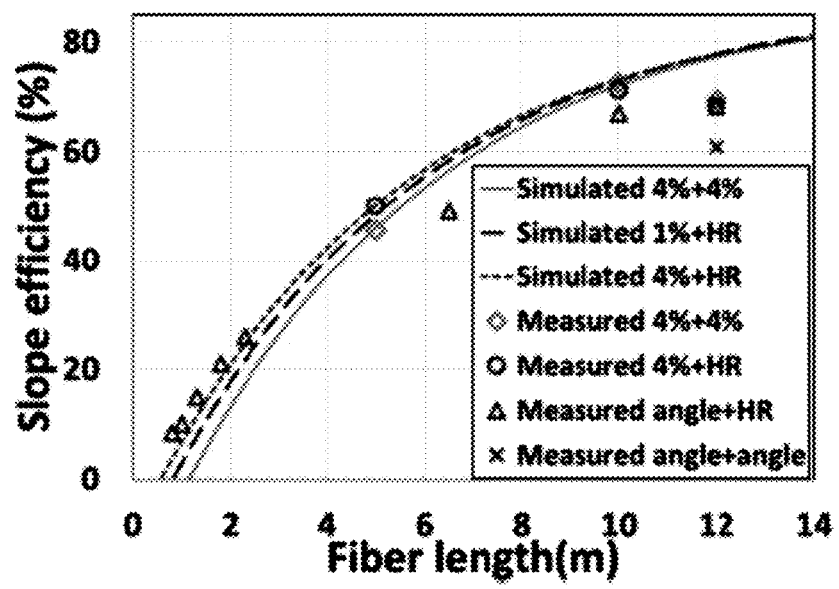
FIG. 9 illustrates the measured and simulated pumping efficiencies versus coupled pump powers (slope efficiencies) versus fiber length for the fiber laser of FIG. 8 at 976 nm emission and 915 nm pumping (signal loss: 0.02 dB/m, pump loss: 0.02 dB/m) for a number of laser arrangements.

Slope efficiency was also measured in a number of configurations. Laser outputs from both ends were added for the calculation of the efficiency. Results are shown in FIG. 9. The 4%+4% arrangement was used initially, since this was the easiest to test. A power efficiency of approximately 72.6% was achieved with a 10 m fiber. Maximum output for laser 1 (pump end) was 19.9 W and for laser 2 was 31.5 W in this case. The $M^2$ for the laser 1 (pump end) was measured to be about 1.3.

Figure 10:
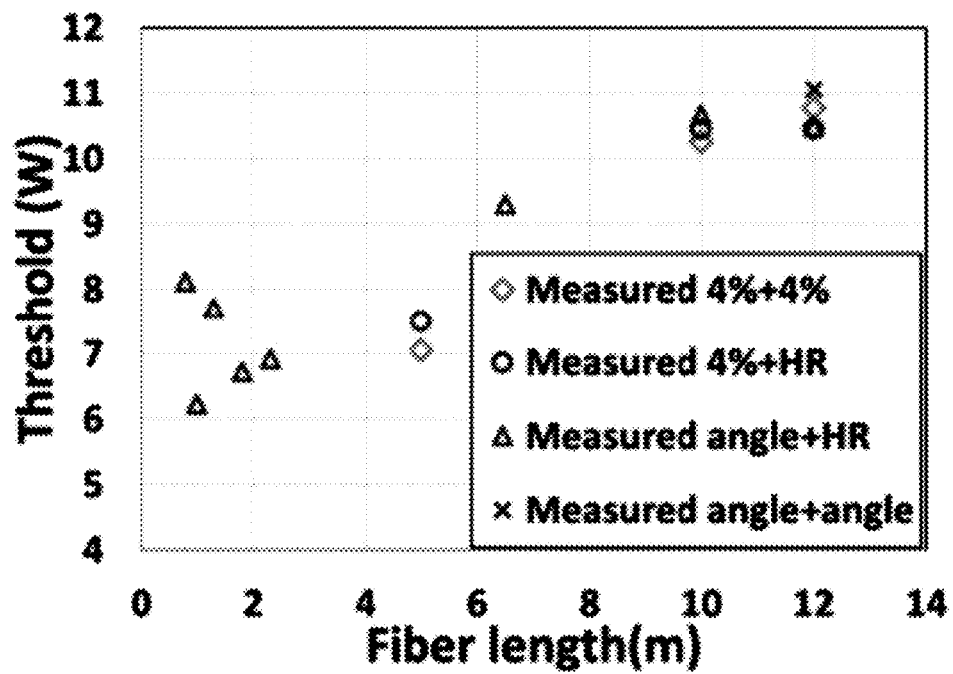
FIG. 10 presents the measured thresholds versus fiber length for the fiber laser of FIG. 8 at 976 nm emission and 915 nm pumping.

Several other configurations were also tested. This included 4%+HR, angle+HR, and angle+angle. The high cavity gain was sufficient to enable lasing for schemes with not only one angled cleave but two angled cleaves, albeit with a slight efficiency reduction. The efficiency decreased beyond 10 m. This was expected when inversion fell too low far from the pump end, also evidenced by an increase in threshold with longer fibers, shown in FIG. 10.

Figure 11:
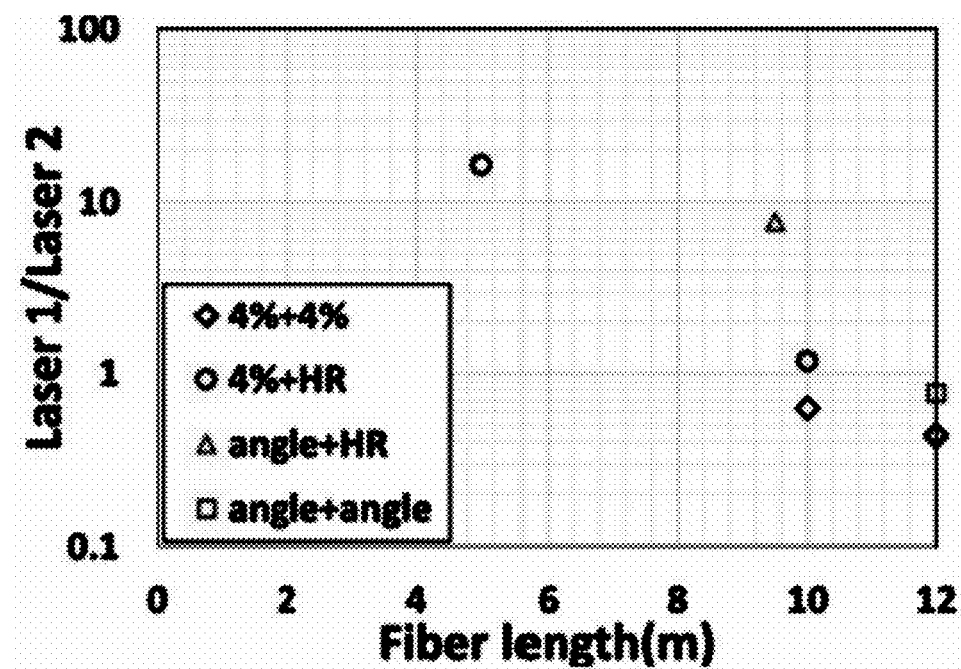
FIG. 11 presents the ratio of output powers of laser 1 to laser 2 for the laser configuration of FIG. 8 for various counter-pumping schemes.
Figure 12:
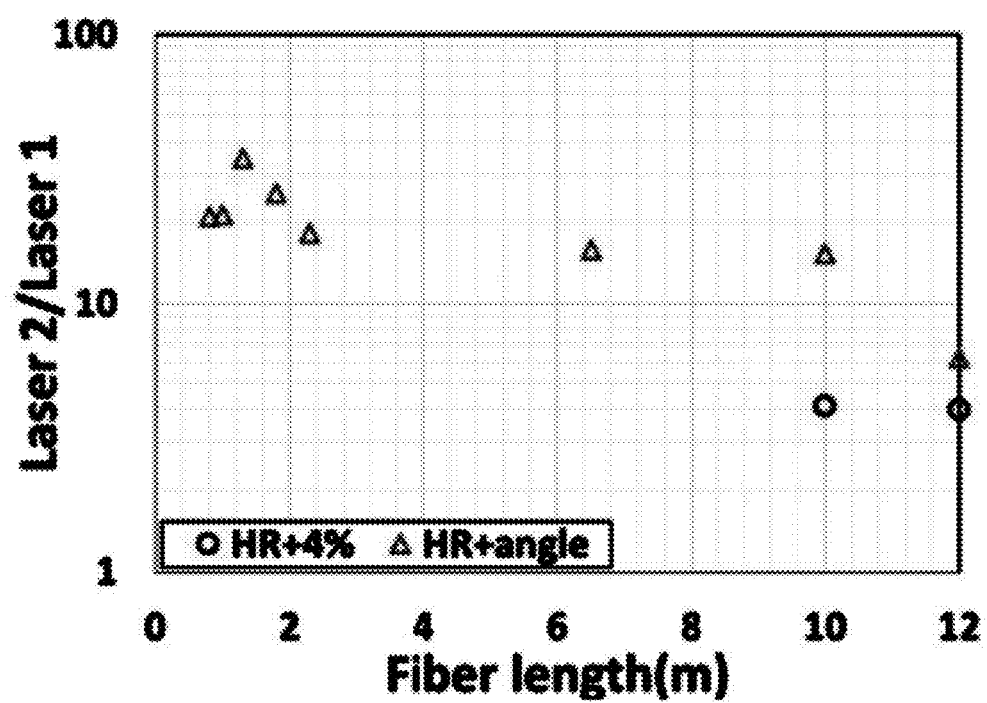
FIG. 12 presents the ratio of output powers of laser 2 to laser 1 for the laser configuration of FIG. 8 for various co-pumping schemes.

The ratio of output powers of laser 1 to laser 2 was also maximized for counter-pumping schemes (FIG. 11), and the ratio of output powers of laser 2 to laser 1 for co-pumping schemes (FIG. 12). Using HR FBG with a reflectivity >99% typically over ~2 nm in wavelength, output was still observed passing through the FBG HR (laser 2). A typical laser output spectrum had a 3 dB bandwidth of 1-2 nm and 10 dB bandwidth of ~4 nm. The ratio of outputs of laser 1 to laser 2 was maximized with the angle+HR scheme for the counter-pumping case, shown in FIG. 11. These indicated a strong ASE nature of the fiber lasers, where a higher reflection at the pump end increased laser 2 output, vice versa for laser 1 output. The ratio also decreased for long fiber lengths. A significant amount of light at the laser wavelength was also observed in the cladding for laser 2 when using long fibers in the counter-pumping cases, shown in FIG. 11. For the co-pumping schemes in FIG. 12, the ratio of output of laser 2 to laser 1 was maximized for the HR+angle scheme, i.e., HR at the pump end.

Figure 13:
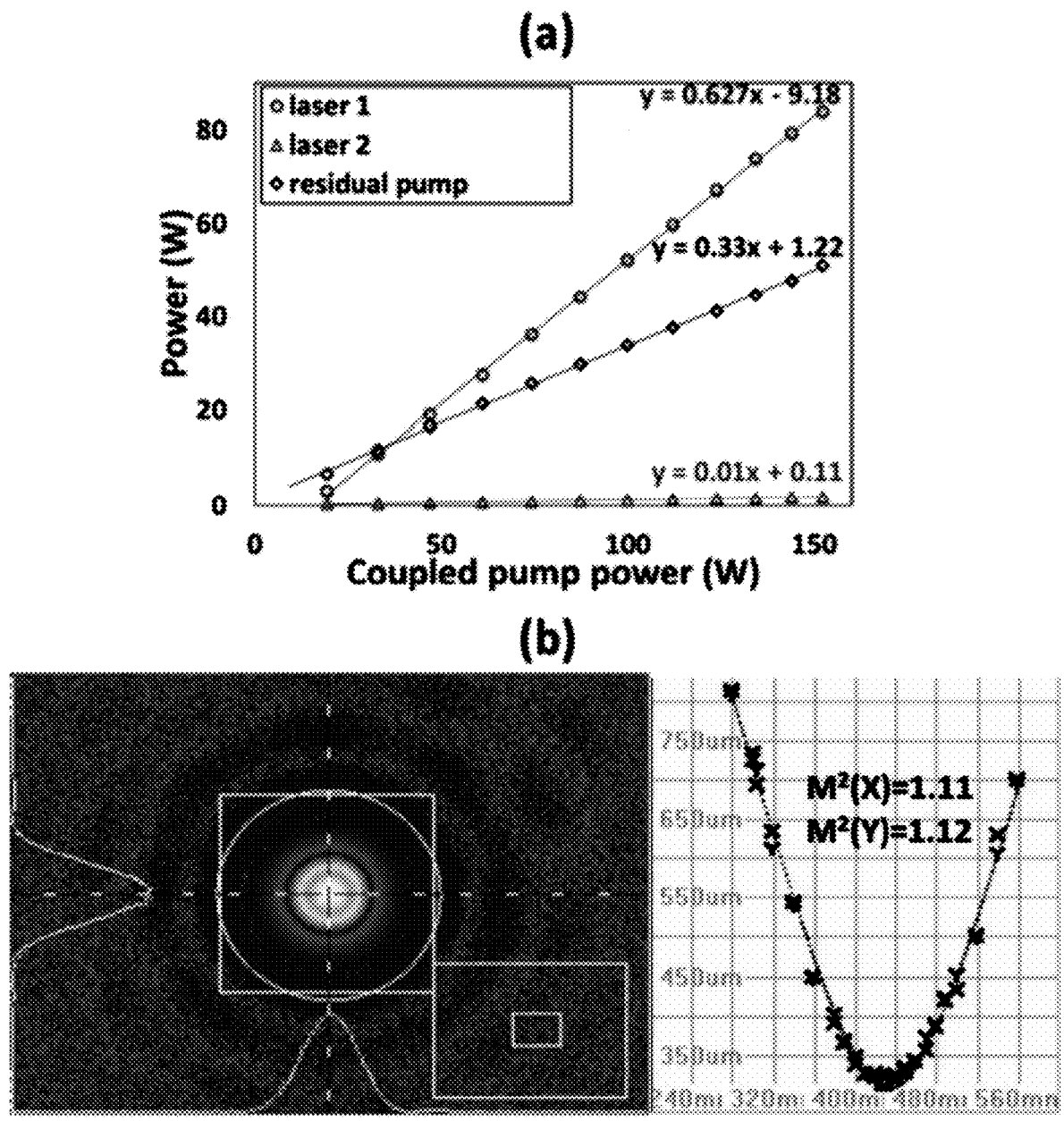
FIG. 13 presents at (a) the output powers of laser 1 and laser 2 and residual pump versus coupled pump power and at (b) $M^2$ measurement for the laser configuration of FIG. 8 with 9 m of the PBF.
Figure 14:
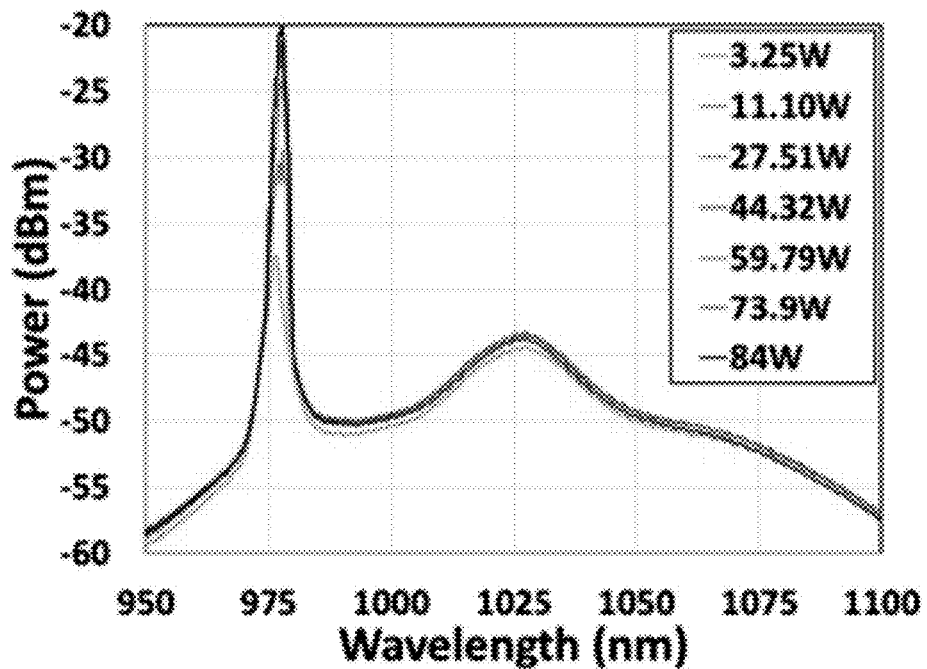
FIG. 14 presents spectra of laser 1 of the laser configuration of FIG. 8 with 9 m of the PBF at various powers with a wide spectral range.
Figure 15:
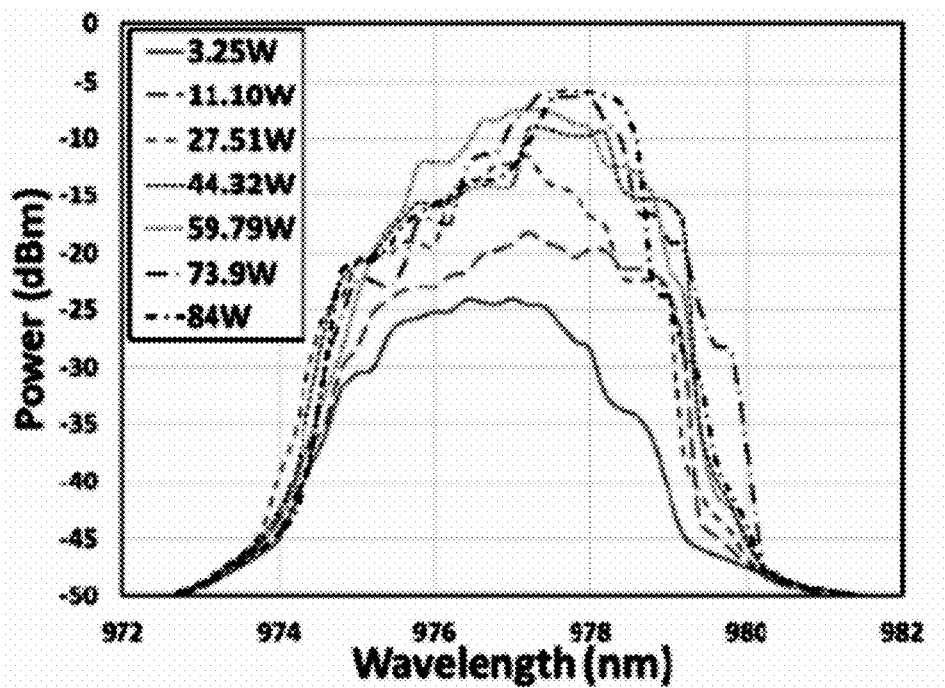
FIG. 15 presents spectra of FIG. 14 close-in at the lasing wavelength.

The output powers of laser 1 and 2, along with residual pump power, are plotted in FIG. 13 at (a) for the angle+HR configuration with 9 m fiber length and a 200 W 915 nm pump diode. $M^2$ was measured to be 1.11 and 1.12 respectively for the two axes at 80 W for laser 1 (FIG. 13 at (b)). $M^2$ was also measured at several other powers throughout the output power range and was found to change very little. The efficiency with regard to the coupled pump power was 62.7% for just laser 1 output. The efficiency of the combined output powers of laser 1 and laser 2 with regard to the absorbed pump power was about 94%, at the quantum limit. For most of the lasers tested even involving fibers which had been repeatedly used over many months, the efficiency of the combined output powers with regard to the absorbed pump power was mostly very close to the quantum-limited efficiency, a testament to the low excess loss and photodarkening of the fiber (FIG. 14, FIG. 15). The ASE at ~1026 nm was well suppressed with signal-to-noise ratio >40 dB (FIG. 14).

In order to measure the homogenous linewidth of the transition at 976 nm, measurement of spectral hole burning was attempted. A counter-pumped amplifier was set up using 3.5 m fiber with both ends angle-cleaved. A single-mode diode at about 976 nm was used as the seed laser. 519 mW was launched into the fiber after passing a fiber-coupled isolator. The spectral linewidth of the seed laser could not be fully resolved by the OSA with 20 μm resolution. For each pump power, two spectra were collected, one with the seed off and one with the seed on. The respective powers at the output were also measured after the pump was rejected by a dichroic mirror.

Figure 16:
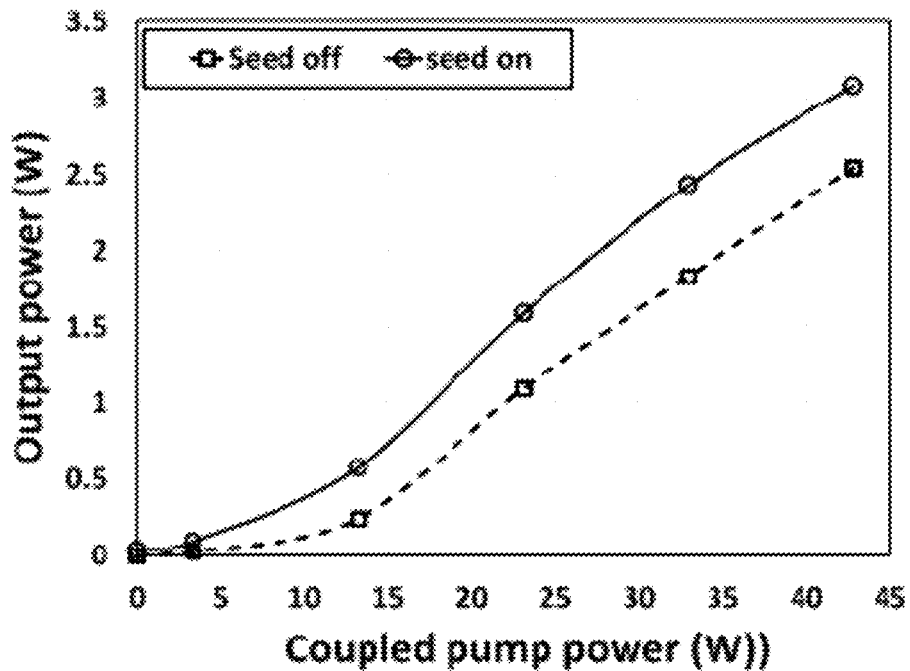
FIG. 16 presents output powers for seed on and off versus coupled pump powers at about 915 nm for a counter-pumped amplifier using 3.5 m PBF.
Figure 17:
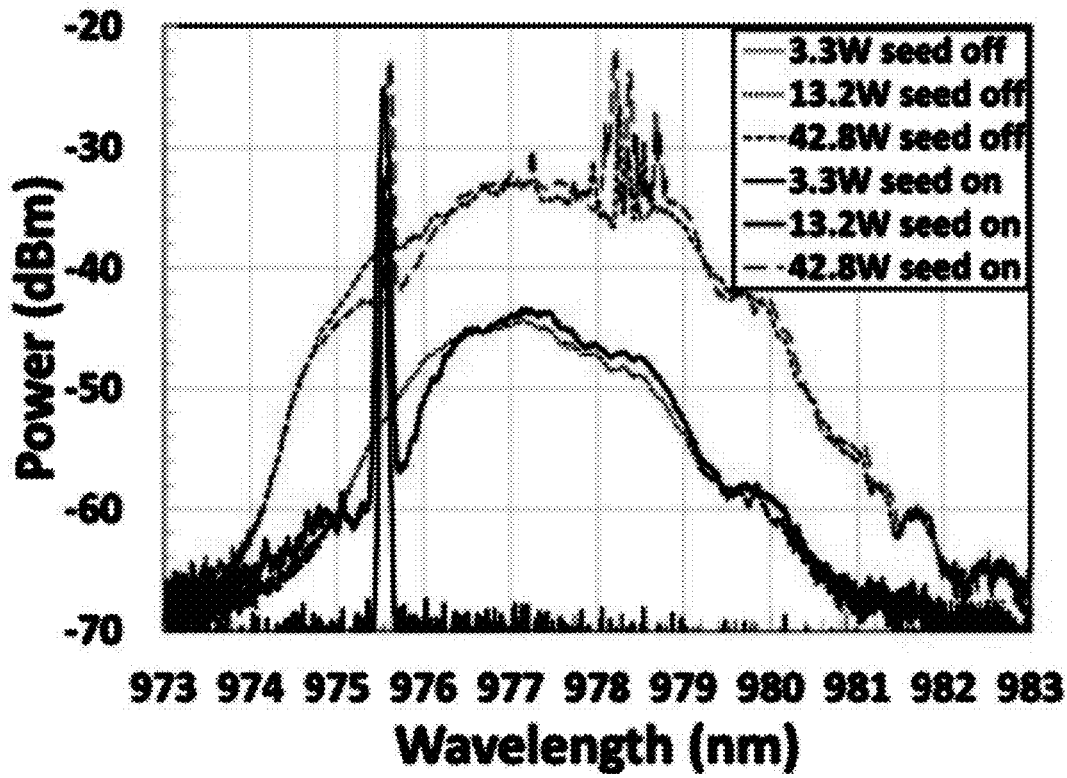
FIG. 17 presents spectra for seed on and off at various pump powers at about 915 nm for the counter-pumped amplifier using 3.5 m PBF.
Figure 18:
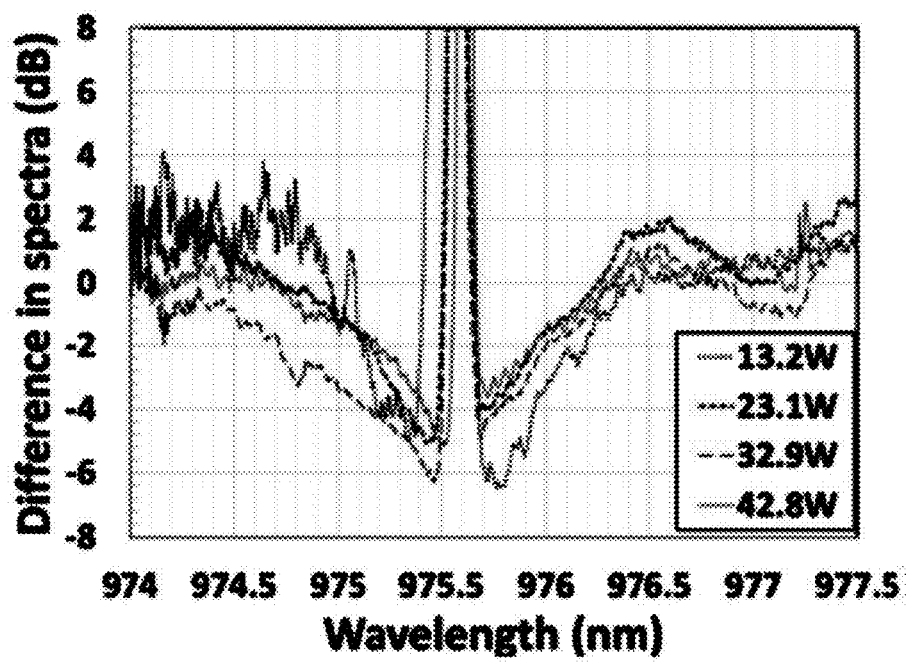
FIG. 18 presents the differential spectra for various pump powers at about 915 nm for the counter-pumped amplifier using 3.5 m PBF.

The output powers for both seed on and seed off are plotted versus coupled pump powers in FIG. 16. The spectra for seed on and seed off for three pump powers at 3.3 W, 13.2 W and 42.8 W are given in FIG. 17. The OSA spectral resolution was 20 μm for all spectra collected. At the low pump power of 3.3 W, the seed laser spectrum could be clearly seen to be resolution limited without any side bands. At pump powers of 13.2 W and 42.8 W, spectral hole burning could be clearly seen by comparing the spectra for seed on and off. At the pump power of 42.8 W, lasing could be seen at approximately 978.2 nm. The spectral difference between seed on and off are plotted in FIG. 18 for various pump powers in order to see the spectral hole burning clearly. The FWHM of the spectral hole was about 1 nm. It is worth noting the significant depth of the spectral hole of up to 6 dB in this case, indicating the emission at approximately 976 nm was mostly inhomogeneously broadened. The low saturation intensity and inhomogeneous nature of the emission can easily explain the observed broad laser linewidth. This was believed to be the first time that spectral hole burning has been observed in an ytterbium-doped fiber.

Example 2

A fiber laser operating at approximately 978 nm was built using an Yb-doped PBF as described in Example 1. The laser achieved continuous wave output power of 151.4 W with laser slope efficiency of 63%, which increased maximum output power by a factor of about 2 while maintaining the high laser efficiency as described in Example 1, above.

Figure 19:
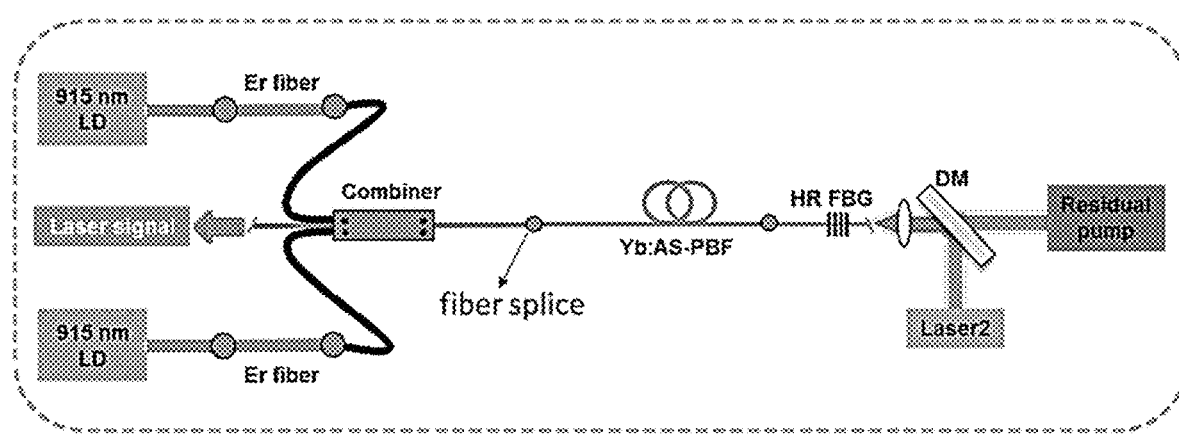
FIG. 19 schematically illustrates the configuration of an Yb-based 3-level-system monolithic fiber laser system used in the Examples section.

The basic laser arrangement was a counter-pumped monolithic configuration shown in FIG. 19 with two pump diodes at ~915 nm (200 W, 0.22NA 105/125 μm) spliced to a 2+1 pump combiner. Three meters of 20/105 μm Er-doped fiber with a highly Er doped core (7 wt % Er) coiled at 5 cm in diameter was used in each pump path to absorb any backward propagating leakage light at the lasing wavelength at approximately 978 nm. Pump loss at about 915 nm was measured to be about 0.1 dB for the 3 m Er fiber and about 0.46 dB for the pump combiner. The high-reflectivity FBG was written in-house using a frequency-quadrupled YAG laser at 266 nm in a 24/125 μm photosensitive fiber which was also made in-house. The FBG had a reflectivity of >99% and a bandwidth of ~2 nm. The output was angle cleaved.

The length of the bandgap fiber was optimized first by progressively cutting back the bandgap fiber while fully characterizing the laser performance. The bandgap fiber was coiled to 15 cm diameter, and the residual pump light, as well as the light at the lasing wavelength (laser 2), were monitored at the far end.

Figure 20:
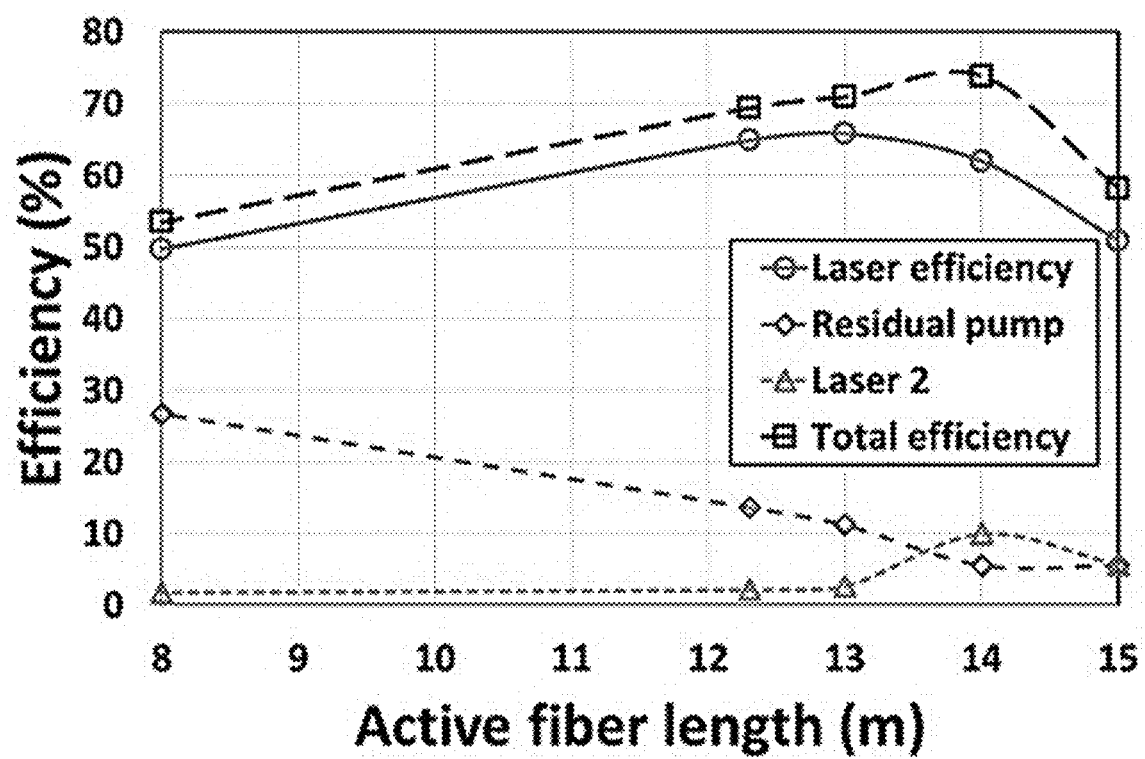
FIG. 20 provides laser performance versus active fiber length for the laser configuration of FIG. 19.

Laser efficiency, total efficiency, residual pump as percentage of the launched pump power, and laser 2 as percentage of the launched pump power are shown versus the photonic bandgap fiber length in FIG. 20. Laser efficiency accounted for only output power from the pump combiner with respect to the launched pump. Total efficiency accounted for both laser output powers with respect to the launched pump. Residual pump was determined with respect to the launched pump power. Laser 2 was determined with respect to the launched pump.

As indicated in FIG. 20, the optimized fiber length was about 13 m, and a 12.3 m fiber was used in the final experiment because the same piece of active fiber had been used for several measurements. Eventually, the active fiber was shortened over the course of the work due to cut-back measurements and fiber cleaving.

Figure 21:
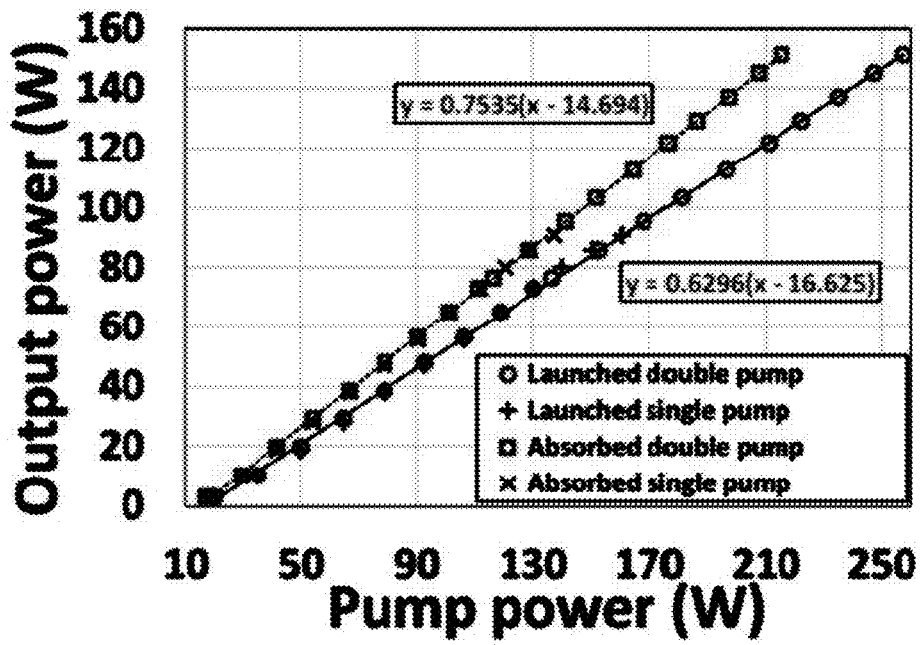
FIG. 21 provides data regarding measured output versus pump power for the laser configuration of FIG. 19 with 12.3 m PBF.
Figure 22:
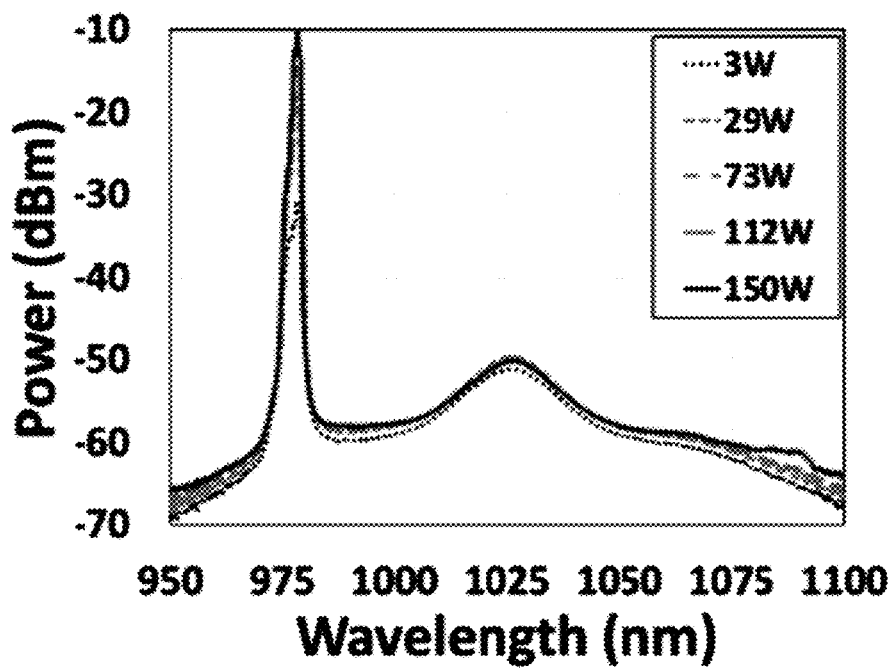
FIG. 22 provides data regarding measured output versus spectra for the laser configuration of FIG. 19 with 12.3 m PBF.

Output powers using a single pump and a double pump are shown vs. pump power in FIG. 21 and vs. the spectra in FIG. 22 at various powers. These output power data do not include the output power at laser 2. A maximum output power of 90.9 W at the output was achieved with a single pump and 151.4 W with double pumping, limited by available pump powers in each case. The corresponding output for the double pumping at laser 2 was 7 W, i.e., 4.4% of a total power of 158.4 W. With double pumping, the efficiency was about 63% and about 75.4% with regard to the launched pump power after the combiner and absorbed pump power, respectively. The efficiency of about 63% was at the same level as the efficiency of 62.7% that was achieved in the free-space bulk optics laser configuration of Example 1, but in this system, much higher output power was achieved using the monolithic configuration. The ASE from the 4-level system was well suppressed to below 40 dB at highest laser output power.

Figure 23:
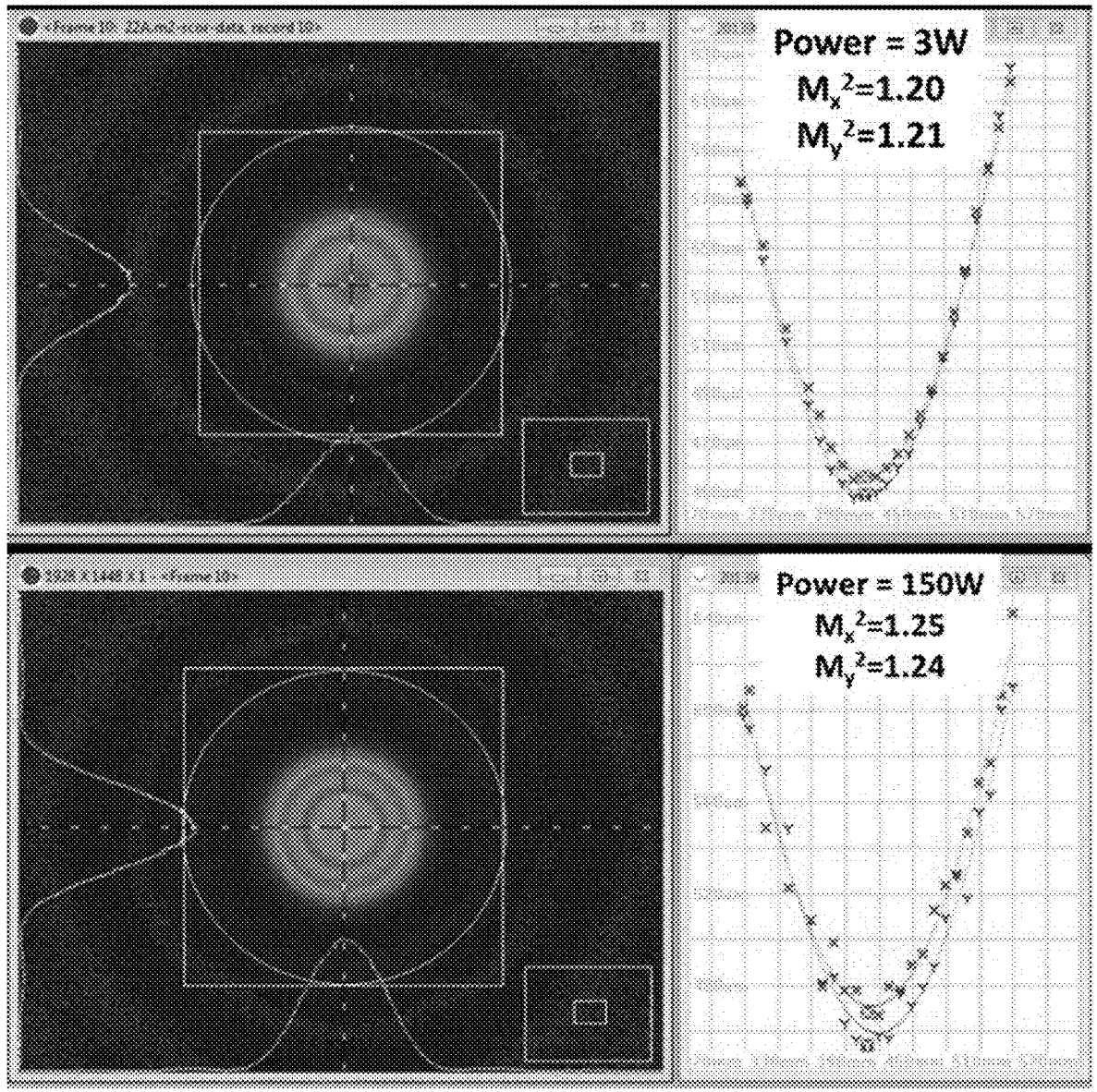
FIG. 23 provides $M^2$ measurement at output of 3 W and 150 W for the laser configuration of FIG. 19 with 12.3 m PBF.

The $M^2$ at approximately 150 W was 1.25/1.24 (FIG. 23), which was also found to be almost constant across the whole power range. The $M^2$ at approximately 3 W was 1.20/1.21.

Figure 24:
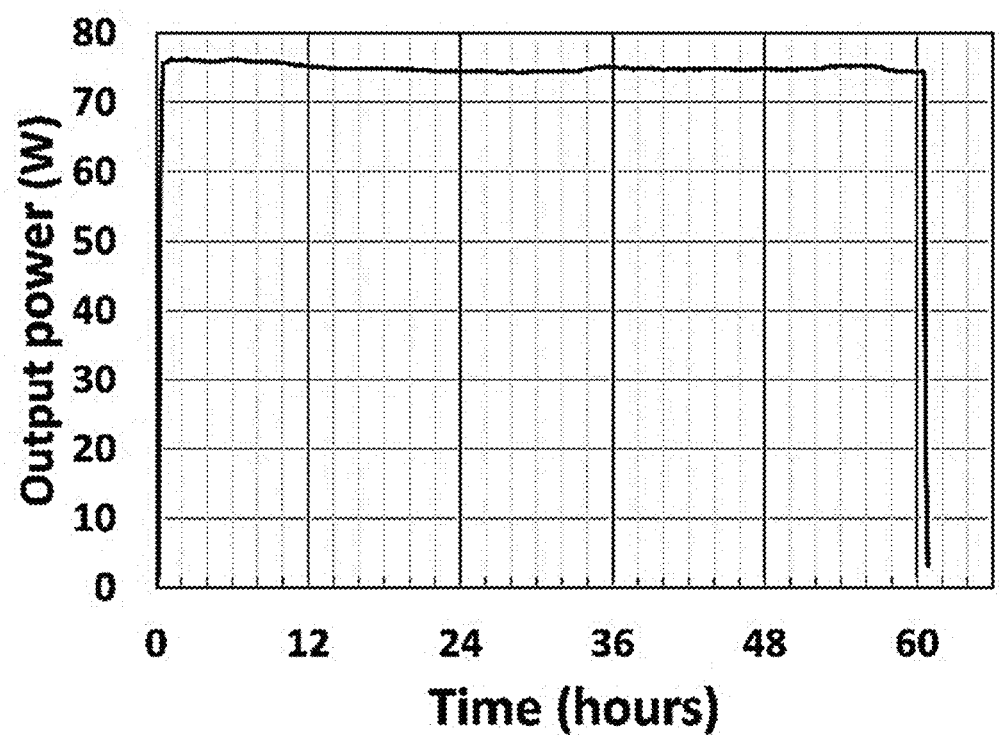
FIG. 24 illustrates results of a laser stability test at 75 W following use for 60.8 hrs.

The Yb phosphosilicate core glass used in the PBF is known for high resistance to photo-darkening, and it exhibited negligible degradation of laser performance over a period of several months and numerous tests. A long-term power stability experiment was conducted over approximately 60 hours with a single-pump configuration under the output power at approximately 75 W. Results are shown in FIG. 24. Apart from some power fluctuations in the few percent levels, most likely due to temperature changes in the area, there was very little sign of photo-darkening. The long-term stability test was performed with only a single pump so as to ensure safety while running the laser continuously over the course of the experiment.

While certain embodiments of the disclosed subject matter have been described using specific terms, such description is for illustrative purposes only, and it is to be understood that changes and variations may be made without departing from the spirit or scope of the subject matter.

What is claimed is:

1. A solid state laser comprising:
    a pump source, the pump source comprising an optical pump and an all solid, single mode photonic bandgap fiber (PBF) in optical communication with the optical pump, the PBF comprising:
        i) a core having a first cross-sectional dimension of about 20 micrometers or greater, the core comprising a gain medium capable of operating as a 4-level system having a first emission wavelength and also as a competing 3-level system having a second emission wavelength, wherein the emission cross section of the first emission wavelength in the gain medium is less than the emission cross section of the second emission wavelength in the gain medium,
        ii) a waveguide cladding external to the core having a second cross-sectional dimension, the ratio of the first cross-sectional dimension to the second cross-sectional dimension being 15% or greater, the waveguide cladding comprising a series of nodes surrounded by a background material, the waveguide cladding defining a transmission band of the PBF, and
        ii) a pump cladding external to the waveguide cladding; wherein
    the first emission wavelength falls outside of the transmission band and the second emission wavelength falls within the transmission band; and wherein
    the solid state laser is configured to receive a laser signal at the second emission wavelength delivered from the pump source with an average power of about 50 Watts or greater, a peak power of 100 Watts or greater, and at a pumping efficiency of about 60% or greater.

2. The solid state laser of claim 1, wherein the pump source delivers the laser signal at the second emission wavelength with a diffraction limited mode quality of about 1.3 or less.

3. The solid state laser of claim 1, the gain medium comprising a laser active dopant selected from neodymium, ytterbium, erbium, thulium, praseodymium, and holmium, or any combination thereof.

4. The solid state laser of claim 3, the gain medium comprising an ytterbium-doped glass.

5. The solid state laser of claim 4, the gain medium comprising an ytterbium-doped phosphosilicate glass.

6. The solid state laser of claim 1, the series of nodes comprising individual nodes having a cross-sectional dimension of about 0.5 micrometers or more.

7. The solid state laser of claim 1, the series of nodes comprising individual nodes having a cross-sectional dimension of about 1 micrometer to about 10 micrometers.

8. The solid state laser of claim 1, adjacent individual nodes of the series of nodes having a pitch of from about 2 micrometers to about 20 micrometers.

9. The solid state laser of claim 1, wherein the pump source is a monolithic fiber laser.

10. The solid state laser of claim 1, wherein the pump source delivers a laser signal at the second emission wavelength with an average power of greater than 100 W and a peak power of about 200 W or greater.

11. The solid state laser of claim 1, wherein the pump source delivers a laser signal at the second emission wavelength with an average power of greater than 150 W.

12. The solid state laser of claim 1, wherein the gain medium is a Yb-doped gain medium.

13. The solid state laser of claim 1, wherein the PBF has a length of from 1 meter to 13 meters.

14. A method for forming the solid state laser of claim 1 comprising:
    drawing the all-solid, single-mode photonic bandgap fiber (PBF) from a preform,
    sizing individual nodes of the series of nodes of the waveguide cladding to define the transmission band of the PBF; and
    locating the PBF in optical communication with the optical pump.

15. The method of claim 14, further comprising locating the PBF in optical communication with one or more additional pumps.

16. The method of claim 14, further comprising locating the PBF in optical communication with a seed pump, the seed pump delivering an optical signal to the PBF at the second emission wavelength.

17. The method of claim 14, further comprising coupling the PBF to one or more additional optical fibers, the coupling being free of any free-space optics.

* * * * *